United States Patent
Bonfigt et al.

(10) Patent No.: US 8,504,273 B2
(45) Date of Patent: Aug. 6, 2013

(54) COEFFICIENT OF FRICTION BASED LIMITATION OF THE TORQUE OF A VEHICLE CONTROL LOOP

(75) Inventors: Martin Bonfigt, Eurasburg (DE); Ralf Pillmeier, Rosenheim (DE); Silvia Moradiellos Rios, Munich (DE); Manfred Wachinger, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 338 days.

(21) Appl. No.: 12/946,226

(22) Filed: Nov. 15, 2010

(65) Prior Publication Data

US 2011/0125382 A1 May 26, 2011

(30) Foreign Application Priority Data

Nov. 25, 2009 (DE) .......................... 10 2009 055 683
Sep. 14, 2010 (EP) ....................................... 10176603

(51) Int. Cl.
*B60T 8/175* (2006.01)
*B60T 8/1763* (2006.01)

(52) U.S. Cl.
USPC ................................. 701/71; 701/82; 701/80

(58) Field of Classification Search
None
See application file for complete search history.

(56) References Cited

U.S. PATENT DOCUMENTS

| | | | |
|---|---|---|---|
| 5,070,960 A * | 12/1991 | Nobumoto et al. | 180/197 |
| 5,325,300 A | 6/1994 | Tsuyama et al. | |
| 5,671,143 A * | 9/1997 | Graber | 701/72 |
| 5,713,332 A | 2/1998 | Adler et al. | |
| 6,253,142 B1 | 6/2001 | Sauter et al. | |
| 6,487,998 B1 | 12/2002 | Masberg et al. | |
| 6,494,282 B1 | 12/2002 | Hessmert et al. | |
| 7,330,785 B2 | 2/2008 | Odenthal et al. | |
| 2001/0003805 A1 | 6/2001 | Koibuchi | |
| 2005/0234628 A1 | 10/2005 | Luders et al. | |
| 2006/0025895 A1* | 2/2006 | Jansson | 701/1 |
| 2007/0271018 A1* | 11/2007 | Hofmann et al. | 701/69 |
| 2009/0062068 A1 | 3/2009 | Nakai et al. | |
| 2009/0228181 A1 | 9/2009 | Luders et al. | |

FOREIGN PATENT DOCUMENTS

| | | |
|---|---|---|
| DE | 44 30 108 A1 | 2/1996 |
| DE | 199 33 087 A1 | 1/2001 |
| DE | 10 2007 051 590 A1 | 4/2009 |
| WO | WO 03/074337 A1 | 9/2003 |

OTHER PUBLICATIONS

European Search Report dated Feb. 25, 2011 including partial English-language translation (Ten (10) pages).

* cited by examiner

*Primary Examiner* — Michael J Zanelli
(74) *Attorney, Agent, or Firm* — Crowell & Moring LLP

(57) ABSTRACT

A process is provided for limiting a torque or an amount characteristic thereof of a control loop used for stabilizing a vehicle. A coefficient of friction is detected according to the process. The coefficient of friction is estimated by way of vehicle-internal quantities. As a function of the coefficient of friction, a limit value is determined for the torque or the amount characteristic thereof. The torque or the amount characteristic thereof will subsequently be limited to the limit value.

18 Claims, 3 Drawing Sheets

COEFFICIENT OF FRICTION BASED LIMITATION OF THE TORQUE OF A VEHICLE CONTROL LOOP

CROSS REFERENCE TO RELATED APPLICATIONS

This application claims priority under 35 U.S.C. §119 from German Application No. DE 10 2009 055 683.4, filed Nov. 25, 2009 and European Patent Application No. EP 10176603.8, filed Sep. 14, 2010, the entire disclosures of which are herein expressly incorporated by reference.

BACKGROUND AND SUMMARY OF THE INVENTION

The invention relates to control systems used for stabilizing a vehicle, such as wheel slip control systems, antilock systems, braking assistants or vehicle dynamics control systems.

The triggering of an automatic control system for stabilizing a vehicle, for example, a wheel slip control system, typically does not take place before the start of any instability of a vehicle, for example, when a permissible wheel slip limit is exceeded; i.e. when the wheel slip is outside the limits permissible with respect to vehicle stability.

The reaction of the automatic control system takes place within a different time period as a function of vehicle-specific integration environments (components, hardware, onboard wiring system, etc.). Under unfavorable marginal conditions, the reaction may not take place before a point-in-time at which the control deviation is already quite advanced which, in turn, results in intensive interventions of the control system.

The high intensity of the control interventions leads to an increased load profile of the onboard wiring system and of components as well as to loss of comfort in the driver's perception.

It is therefore an object of the invention to provide a process and a corresponding system which decrease the high intensity of the control interventions of such automatic control systems and reduce the disadvantages connected therewith.

This and other objects are achieved by a process and corresponding system for limiting a torque or an amount characteristic thereof of a control loop used for stabilizing a vehicle. The process detects a coefficient of friction ($\mu$s,r, $\mu$s,f), determines a limit value (Mg) for the torque or the amount characteristic thereof as a function of the estimated coefficient of friction ($\mu$s,r, $\mu$s,f), and limits the torque or the amount characteristic thereof to the limit value (Mg).

A first aspect of the invention is aimed at processes for limiting a torque, or an amount characteristic thereof, of a control loop used for stabilizing a vehicle. The control loop may, for example, include a wheel slip control system, an antilock system, a brake assistant system or a system controlling the dynamics of vehicle movements. The torque preferably causes a buildup of force in the longitudinal direction of one or more wheels, because typically no active torque influence takes place in the transverse direction. The torque may, for example, be an acceleration torque or a deceleration torque. The resulting longitudinal-force buildup of the vehicle takes place, for example, in the deceleration or acceleration direction of the vehicle and can influence the dynamic longitudinal and/or dynamic lateral behavior.

An amount characteristic of a torque is an amount or parameter that has a certain connection with a torque, particularly a linear connection. The value may, for example, be power, force or acceleration information. Thus, in the application, all information concerning the torque also applies to such a characteristic value in the same fashion. And, as used herein, the term "torque" includes an amount characteristic thereof.

In the process, a coefficient of friction is determined. For detecting the coefficient of friction, an additional sensor system for determining the coefficient of friction can be used. The coefficient of friction is preferably estimated by way of vehicle-internal quantities. The estimation of a coefficient of friction by way of vehicle-internal quantities is described in Chapter 2.3.1 of the reference book "Verbesserungspotenzial von Stabilisierungssystem im Pkw durch eine Reibwertsensorik" ("Improvement Potential of a Stabilization System in a Passenger Car by Means of a System for Sensing the Coefficient of Friction"), by Ingo Weber, Fortschr.-Ber. VDI Reihe 12, No. 592, VDI Verlage 2005. The statements concerning the estimation of a coefficient of friction made there are hereby expressly incorporated by reference herein. The estimation of the coefficient of friction by means of vehicle-internal quantities can be supported by additional sensor systems (for example, systems integrated in the tire, or camera-based). The estimated coefficient of friction can thereby be checked with respect to plausibility by use of a sensor in the tire or by use of the camera image. The coefficient of friction may, for example, be a coefficient of friction of a tire, of a vehicle axle or a coefficient of friction of the entire vehicle.

A limit value for the torque or the amount characteristic thereof is determined as a function of the coefficient of friction. This limit value may, for example, be oriented according to the torque radius of a Kamm's friction circle, which is a function of the coefficient of friction. In particular, it may be slightly larger than this torque radius. The torque or the amount characteristic thereof is limited to the thus determined limit value.

The limitation by the limit value can take place, for example, in the upward or downward direction. A limitation of the drag torque by the limit value in the downward direction makes sense, for example, in the case of an automatic engine drag torque control, where the negative torque is briefly increased in the acceleration direction, and the drag torque is thereby reduced in order to keep the vehicle stable. The method of limiting the drag torque can also be used in a drive drag torque control of a hybrid vehicle with recuperation, where the recuperation torque of the electric machine is controlled in the coasting operation, instead of being used in an engine drag torque control.

As a result of the determination of a limit value for the control disposed on the input side of the current control, the torque (or the amount characteristic thereof) can be limited to a value adequate for the driving situation, so that the intervention of the control system in the vehicle driving performance is clearly reduced. This leads to a reduced load profile of the on-board wiring system and components as well as to the improvement of comfort in the driver's perception.

The process according to the invention is therefore to some extent a pilot control disposed on the input side of the control loop or a preconditioning of the field. However, in contrast to a classic pilot control, this pilot control determines a limit value within the control loop, for example, for a control variable of the control loop or for a value within the controlled system (particularly within the driving or braking control), instead of directly applying a value to the control variable of the control loop. The process according to the invention preferably determines a limit value for the transmission behavior (and optionally for the transmission dynamics) within the controlled system. The pilot control preferably limits the occurring control difference, for example, in the absolute value or in the time behavior, by influencing the controlled system or the transmission behavior of the controlled system essentially independently of the control loop; the control on the output side is thereby weakened or the initial control threshold is not reached.

The coefficient of friction is preferably determined when the reaching of a stability limit is detected or in the case of a control activity (which typically takes place when the stability limit has been reached). The reaching of a stability limit or control activity can be recognized by analyzing a slip signal or by analyzing a yaw rate signal. For example, it can be determined that a slip exceeds a certain limit (a certain over-slip is therefore present), and/or a yaw rate exceeds a certain limit (for example, when the yaw rate exceeds a so-called Ackermann yaw rate in the downward or upward direction). For this purpose also, an arbitrary control signal (such as a binary digital signal) can be analyzed, which indicates a control activity.

When the stability limit, i.e. the traction limit has been reached, conclusions on the coefficient of friction can be drawn particularly well, because Kamm's static circle is then intersected and the maximal static friction force is reached.

According to a preferred embodiment, the limit value will then be selected such that the control system can pass through the detected stability limit. This permits an activation of the control (which is typically activated at the stability limit) despite the limitation to the limit value. If the amount of the limit value were selected such that there could no longer be a passing through the detected stability limit, the control system could later no longer be activated.

Preferably, when the reaching of a stability limit or the activity of the control loop is detected again, the coefficient of friction will be determined again. Among other things, this makes it possible to adapt the determined coefficient of friction in the downward direction when the nature of the road changes, for example. Specifically, when the traction limit has been reached again, the current coefficient of friction may have decreased and the determined coefficient of friction can then be reduced correspondingly.

The determined coefficient of friction is preferably stored. As long as no adaptation of the determined coefficient of friction takes place, the process can take place by using the stored coefficient of friction. The torque limitation at the current point-in-time will then not take place as a function of the current actual coefficient of friction but rather as a function of a coefficient of friction that was determined from vehicle-internal quantities which describe a condition of the past.

According to an advantageous embodiment, the coefficient of friction is therefore stored. In addition, a current coefficient of friction is determined continuously. The determined coefficient of friction is updated as a function of the stored coefficient of friction and of the current coefficient of friction. When the reaching of a stability limit is detected or an activity of the control system takes place, the updated coefficient of friction will preferably correspond to the current coefficient of friction. The determined coefficient of friction can thereby be reduced (in this manner, the process can "learn down" to a lower value). If the traction limit was not reached or no activity of the control system takes place, the updated coefficient of friction will correspond to the maximum from the current coefficient of friction and the stored coefficient of friction. When the currently determined coefficient of friction therefore is above the stored coefficient of friction, the coefficient of friction can thus be increased (the process can therefore "learn up" to a higher coefficient of friction).

In the process, the coefficient of friction is preferably determined as a function of a torque or of an amount characteristic thereof, particularly a torque or a characteristic value when reaching a traction limit or a control activity. This may, for example, be a wheel torque.

As indicated above, when determining the limit value, it should preferably be taken into account that the control loop will still be capable of passing through the previously detected stability limit. For this purpose, the amount of the limit value per wheel should preferably be larger than the amount of torque per wheel that is used for determining the coefficient of friction.

According to a preferred embodiment, for determining the limit value, a maximal torque or an amount characteristic thereof is determined first as a function of the determined coefficient of friction. The limit value is determined as a function of this maximal amount, in which case the limit value will exceed the maximal amount by a certain extent, for example, by 5% to 15%, particularly by 10%. However, in this case, the limit value should preferably be at least 150-750 Nm (wheel-related axle torque, i.e. behind the differential), for example, 250 Nm or 500 Nm above the maximal amount. Depending on the vehicle and control system, the limit value is applied, for example, by 10% but at least by 250 Nm wheel-related axle torque above the maximal amount.

The maximal amount preferably corresponds to the maximal amount of a torque that causes a buildup of force in the longitudinal direction of one or more wheels thus of a wheel torque or of the sum of several wheel torques in the circumferential direction. Here, the maximal amount of the torque is estimated as a function of the determined coefficient of friction and as a function of a lateral acceleration. This will be explained below in greater detail by means of an embodiment.

According to a preferred embodiment of the process, a vertical wheel force or an amount characteristic thereof is also determined as a function of the vertical wheel force or of the amount characteristic thereof.

A further aspect of the invention is aimed at an arrangement for determining a limit value for a torque (or an amount characteristic thereof) of a control loop used for stabilizing a vehicle.

The arrangement includes devices for detecting a coefficient of friction. In addition, devices are provided for determining a limit value for the torque (or the amount characteristic thereof) as a function of the determined coefficient of friction. These devices operate as described above.

The above statements concerning the process of the invention according to the first aspect of the invention correspondingly apply also to the arrangement according to the invention.

The invention is also aimed at an automatic control system, which includes the above-mentioned arrangement for determining a limit value. The control system may provide devices (for example, a limiting device) which are used for the limitation to the limit value.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
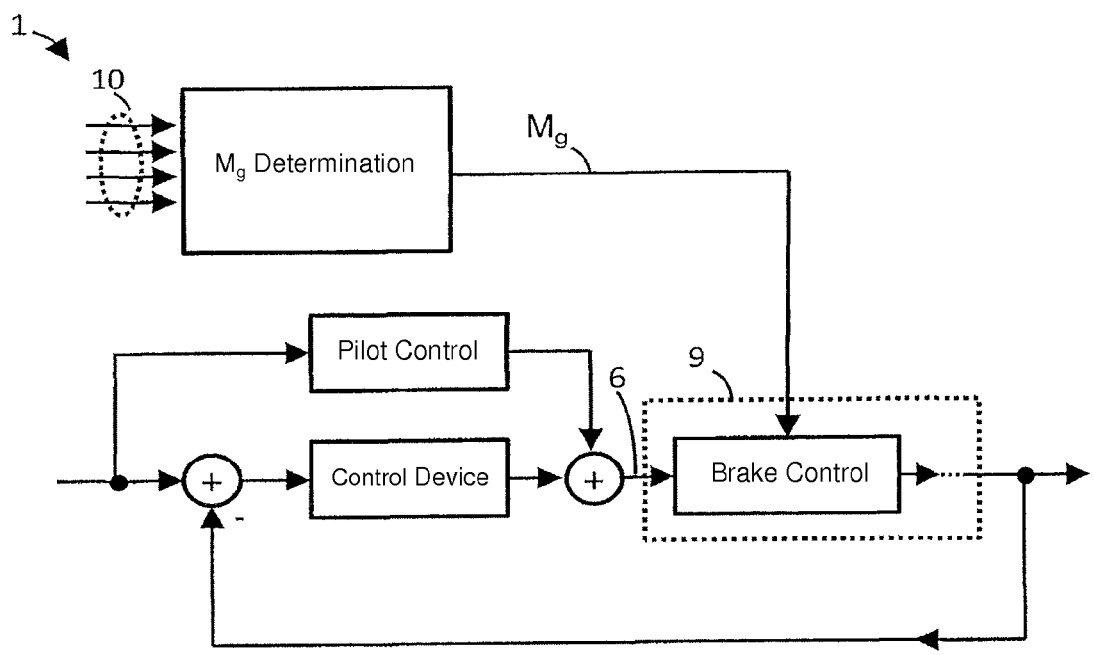
FIG. 1 is a view of a simplified example of a control loop of a motor vehicle which is used for stabilizing the motor vehicle.

FIG. 1 illustrates a simplified example of a control loop 1 of a motor vehicle, which is used for stabilizing the motor vehicle.

Such control loops 1 stabilize the vehicle when it is driven in the limit range. For example, in the case of a wheel slip control system, it is ensured that the wheels do not spin during acceleration. In the case of an antilock system, the brakes of the vehicle are released by the control intervention 6 when the vehicles loses the road grip during braking. In the case of a vehicle dynamics control system, for example, by way of the control intervention 6, individual wheels are braked in a targeted manner in order to avoid a swerving of the vehicle. In principle, the invention can be applied to all control loops for stabilizing the vehicle, for example, also to the engine drag torque control.

The control loop includes a control device 2 as well as a controlled system 9 having, for example, an engine control and/or a brake control 3. This engine control and/or brake control 3 preferably operates by way of a torque structure. By means of the control loop 1, for example, a drive and/or brake power that can be requested by a driver may be adjusted by a control intervention 6 to the engine control and/or brake control 3 as part of the controlled system 9 of the vehicle. In the case of a wheel slip control loop, the slip, for example, is controlled as the controlled variable.

In addition to the feedback control loop, the control system 2 optionally also includes a pilot control 5. This pilot control 5 acts upon the controlled variable of the control loop by way of a value that is independent of the condition of the controlled system.

Furthermore, an arrangement 4 is provided for determining a limit value Mg for the drive and/or brake torque 3. In addition, a limit value for the torque change per unit time or for the acceleration change per unit time can be determined by the arrangement 4. The arrangement 4 is used for determining the limit value as a torque preconditioning, which is disposed on the input side of the actual control system.

By means of vehicle-internal quantities 10, the arrangement 4 estimates a coefficient of friction. On the one hand, the coefficient of friction can be used for determining a limit value Mg for the torque as well as for determining the limit for the torque change. The limit value for the torque change is a function of the estimated coefficient of friction and decreases especially with the reduction of the coefficient of friction (i.e., when the coefficient of friction is low and therefore the road grip is low, the maximally permitted torque change should be lower than in the case of a higher coefficient of friction).

The arrangement 4 determines the coefficient of friction, for example, as a function of a longitudinal acceleration ax, a lateral acceleration ay and a torque signal Mr,dyn. In this case, the estimation is controlled, for example, by means of a slip signal s, a yaw rate signal g and/or a control signal r which indicates the activity of the control loop.

In the arrangement 4, a limit value Mg for a torque is determined as a function of the estimated coefficient of friction. By means of the limit value Mg, a torque can then be limited in the control loop 1, for example in the engine control and/or brake control 3. By means of the determination of a limit value Mg disposed on the input side of the actual control, the torque remains limited to a value that is adequate for the driving situation, so that the intervention of the control system in the driving performance of the vehicle is clearly decreased.

Figure 2:
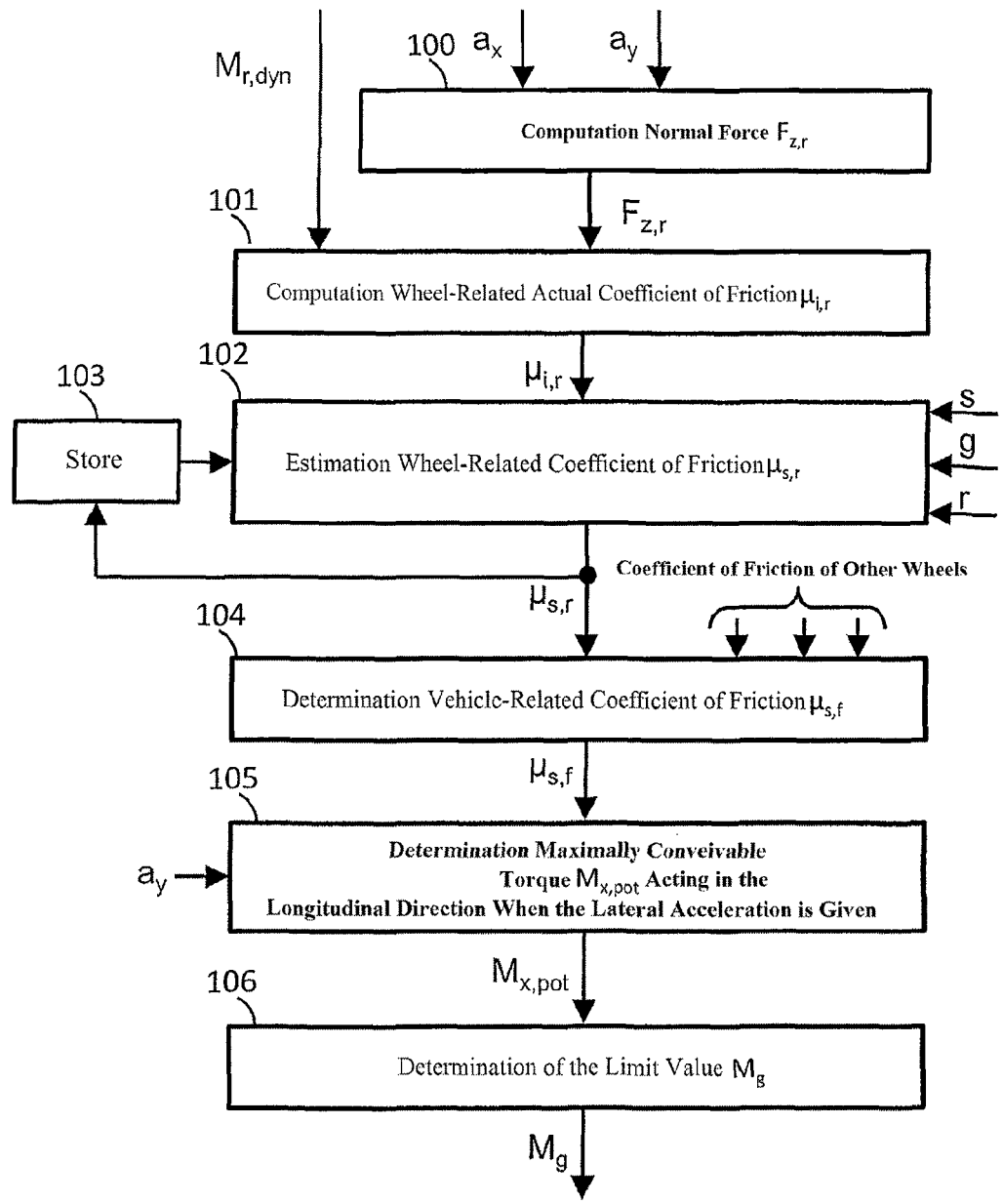
FIG. 2 is a flow chart of an embodiment of a process for determining a limit value.

FIG. 2 shows an embodiment of the process steps taking place in the arrangement 4 for determining the limit value Mg. First, a coefficient of friction is estimated by way of vehicle-internal quantities. The estimation of a coefficient of friction by way of vehicle-internal quantities is described in Chapter 2.3.1 of the reference book "Verbesserungspotenzial von Stabilisierungssystem im Pkw durch eine Reibwertsensorik" ("Improvement Potential of a Stabilization System in a Passenger Car by Means of a System for Sensing the Coefficient of Friction"), by Ingo Weber, Fortschr.-Ber. VDI Reihe 12, No. 592, VDI Verlage 2005. The statements concerning the estimation of a coefficient of friction made there are hereby expressly incorporated by reference herein. The estimation of the coefficient of friction is partly based on the statements made in the above-mentioned reference book.

A wheel-related estimation of the coefficient of friction takes place first. The wheel-related estimation is not absolutely necessary. Instead, the following computing steps could also be carried out directly for an axle or for the entire vehicle.

For estimating the coefficient of friction, a normal force Fz,r (vertical wheel force) is determined in Step 100 for the respective wheel as a function of the vehicle-related longitudinal acceleration ax and the lateral acceleration ay. The values for ax and ay can be determined by use of sensors. This normal force preferably takes into account two fractions: the static weight distribution and the dynamic weight distribution on the basis of the longitudinal acceleration ax and the lateral acceleration ay. By means of the normal force Fz,r as well as a resulting dynamic torque Mr,dyn, an actual value of a wheel-related coefficient of friction $\mu_{i,r}$ is computed in Step 101. In this case, the dynamic resulting torque Mr,dyn preferably includes three fractions: a drive torque, a brake torque as well as a moment of inertia. The wheel-related actual coefficient of friction $\mu_{i,r}$ is determined, for example, as a function of the wheel radius in accordance with the following equation:

$$\mu_{i,r} = \frac{M_{r,dyn}}{r} \cdot \frac{1}{F_{z,r}}$$

The wheel radius r preferably is a dynamic wheel radius.

A wheel-related coefficient of friction $\mu_{s,r}$ is estimated in Step 102. The wheel-related coefficient of friction $\mu_{s,r}$ is determined when a stability limit has been reached (which typically is accompanied by an activity of the control system), in that the estimated value $\mu_{s,r}$ is assessed by way of the current actual coefficient of friction $\mu_{i,r}$, i.e.:

$\mu_{s,r} = \mu_{i,r}$, when the stability limit has been reached.

When the stability limit has been reached, the estimated value $\mu_{s,r}$ is therefore determined as a function of the then current vehicle-internal quantities Mr,dyn and Fz,r (or $\mu_{i,r}$, which is determined from Mr,dyn and Fz,r). The estimated coefficient of friction $\mu_{s,r}$ is stored (see Step 103).

Figure 3:
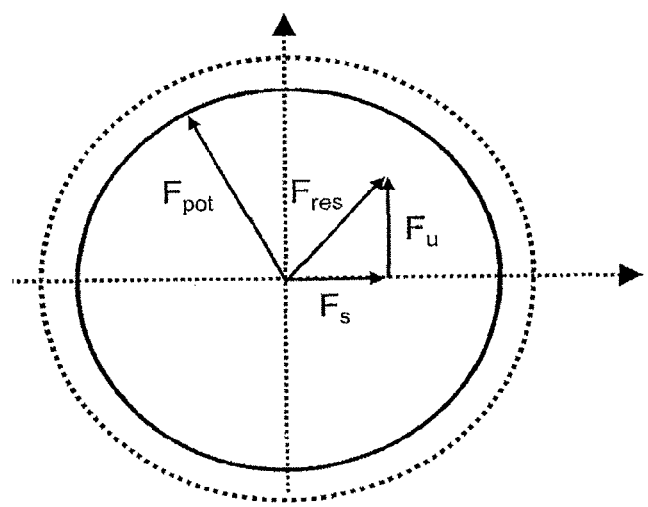
FIG. 3 is a view of an example of Kamm's circle.

The stability limit is obtained from Kamm's circle (or under non-idealized conditions: an ellipse. FIG. 3 shows an idealized Kamm's circle. The radius of the Kamm's circle corresponds to the available maximal total static friction force Fpot which the wheel can transfer to the road. At the stability limit, the static friction typically changes to kinetic friction.

This force Fpot is dependent on the coefficient of friction μ of the wheel and the normal force Fz upon the wheel (loading of the wheel):

$$F_{pot} = \mu_r \cdot F_z$$

According to this model, stability exists when the force Fres resulting from the cornering force Fs in the transverse direction and the braking force or propelling force Fu in the longitudinal direction is situated inside the Kamm's circle. The circle marks the stability limit. Instead of being shown as a force circle, Kamm's circle can correspondingly be shown as a coefficient-of-friction circle or as a torque circle if the force is divided by the normal force or is multiplied by the dynamic wheel radius. The corresponding equation of Kamm's circle for the torque is therefore as follows:

$$M_{pot} = \mu \cdot F_z \cdot r$$

Thus, when the stability limit has been reached, the coefficient of friction μs,r can easily be assessed by way of the equation $$\mu_{i,r} = \frac{M_{r,dyn}}{r} \cdot \frac{1}{F_{z,r}}$$

This equation is the result of the transformation of the above-indicated equation for the torque. When the stability limit has been reached, the torque Mr,dyn will indicate the torque radius of Kamm's circle.

The reaching of the stability limit can be detected by various criteria. The reaching of a stability limit can, for example, take place by analyzing a slip signal s. Specifically, when the utilized total wheel force approaches the limit value, the slip will increase. When the slip s exceeds a certain limit (i.e., when a certain "overslip" is present), this may be evaluated as an indication that the stability limit has been reached. The reaching of the stability limit can also be detected by the analysis of a yaw rate signal g. This can, for example, be recognized by the fact that the yaw rate exceeds or falls below a so-called Ackermann yaw rate. An arbitrary control signal (such as a binary digital signal), which indicates a control activity, can also be analyzed and thereby allows the conclusion that the stability limit has been reached. Depending on how the reaching of the stability limit was detected (whether by way of the slip signal s or the yaw rate signal), preferably either the longitudinal coefficient of friction or the lateral coefficient of friction is determined and is stored as the estimated value for the coefficient of friction. Typically, there is a mutual dependence between the longitudinal and the lateral coefficients of friction. Depending on the type of tire, the tire profile, the kinematics of the chassis and the load event, the longitudinal and lateral coefficients of friction may be identical in their amounts (coefficient of friction circle) or, in a vectorial addition, may describe an elliptical shape (coefficient of friction ellipse). The tire can normally transfer higher coefficients of friction in the longitudinal direction than in the lateral direction (μx,max>μy,max). The estimated value preferably takes into account the mutual dependence as well as a conceivable elliptical eccentricity.

If the stability limit was not reached or no activity of the control system is taking place, the wheel-related coefficient of friction μs,r is determined from the maximum of the current actual coefficient of friction μi,r and of the stored estimated value μs,r; i.e.:

$$\mu_{s,r} = \max(\mu_{i,r}, \mu_{s,r})$$

For initializing the system when the engine is started, a value μs,r can be preset.

Therefore, when the currently determined actual coefficient of friction μi,r is above the stored coefficient of friction μs,r, the estimated coefficient of friction μs,r is increased corresponding to the currently determined actual coefficient of friction (the process can therefore "learn up" to a higher coefficient of friction). Inversely, when the stability limit has been reached, the estimation of the coefficient of friction μs,r according to μs,r=μi,r permits a reduction of the estimated coefficient of friction μs,r (the process can therefore "learn down" to a lower estimated value μs,r).

An estimation of the coefficient of friction μs,r for a wheel was explained above. The coefficients of friction for the other wheels can be estimated in the same manner. From the wheel-related coefficients of friction, a vehicle-related (or axle-related) coefficient of friction μs,f can be determined as a function of the type of drive (rear wheel drive, front wheel drive, all-wheel drive) (see Step 104). This is described in the above-mentioned reference book "Verbesserungspotenzial von Stabilisierungssystem im Pkw durch eine Reibwertsensorik" ("Improvement Potential of a Stabilization System in a Passenger Car by Means of a System for Sensing the Coefficient of Friction"). By using a vehicle- or axle-related coefficient of friction μs,f, the subsequent computing steps can be carried out jointly for the vehicle or the axle. As an alternative, it is, of course, also contemplated to continue to carry out the subsequent computing steps in a wheel-related manner.

With the knowledge of an estimated coefficient of friction μ, for example, by means of the equation known from Kamm's circle $$M_{pot} = \mu \cdot F_z \cdot r$$

a maximally conceivable torque Mpot can now be estimated. In this case, the maximally conceivable torque therefore corresponds to the torque radius of Kamm's circle. Furthermore, the torque Mpot can be increased by an additional dimension ΔM in order to determine the limit value. In this case, the torque radius is therefore enlarged. This is outlined in FIG. 3 by the dotted circle with the enlarged radius.

In the process illustrated in FIG. 2, a maximally conceivable torque is estimated in the longitudinal direction, whereby the computation is slightly modified.

Specifically, the maximally conceivable estimated longitudinal torque Mx,pot is computed from the estimated coefficient of friction μs,f and the current lateral acceleration ay in Step 105. This maximally conceivable estimated longitudinal torque Mx,pot, can probably be removed in the case of a given lateral acceleration and an estimated coefficient of friction. The reason that the longitudinal torque is taken into account here is that the engine control and/or brake control 3 typically controls the longitudinal torque of the vehicle (and not the lateral torque whose control is reserved for the driver).

As described on page 28 in the above-mentioned reference book, the following connection applies to the vehicle-related coefficient of friction and the longitudinal acceleration ax as well as the lateral acceleration ay:

$$\mu_f = \sqrt{\left(\frac{a_x}{g}\right)^2 + \left(\frac{a_y}{g}\right)^2}$$

This relationship can be utilized for estimating the longitudinal acceleration potential ax,max (i.e. the maximally conceivable longitudinal acceleration) in the case of a given lateral acceleration ay and an estimated coefficient of friction μs,f:

$$\mu_{f,s} = \sqrt{\left(\frac{a_{x,pot}}{g}\right)^2 + \left(\frac{a_y}{g}\right)^2}$$

By means of the transformation of this equation, the potential longitudinal acceleration ax,pot can be estimated.

With the knowledge of the estimated potential longitudinal acceleration ax,pot, by means of the relationship $$M_{x,pot} = m \cdot a_{x,pot} \cdot r$$

an estimated value Mx,pot for the maximally conceivable torque acting in the longitudinal direction can be computed, which torque can probably be removed in the case of a given lateral acceleration and an estimated coefficient of friction. This is therefore an estimated value for the torque acting in the longitudinal direction at which the stability limit is just being reached. The estimated value therefore corresponds to the torque radius of Kamm's circle in the direction of the longitudinal acceleration.

After the determination of the radius (Mx,pot) of Kamm's circle, a radius (Mg) is now determined, which is enlarged in comparison to radius (Mx,pot) and which is above the stability limit.

For this purpose, in Step 106, a limit value Mg is determined for the torque acting in the longitudinal direction as a function of the estimated maximal torque Mx,pot, the limit value Mg being by the dimension ΔMx larger than the estimated maximal torque Mx,pot; i.e.:

$$M_g = M_{x,pot} + \Delta M_x$$

With respect to Mx,pot, the limit value Mg can be increased by a certain factor (for example, 10%) or by a constant value (for example, +200 Nm). However, when a certain factor is used, a minimal distance between Mg and Mx,pot should preferably be maintained. The use of a limit value Mg that is increased with respect to Mx,pot therefore makes sense because there is basically always a certain incorrect estimation, and it also has to be ensured that there can still be a passing through the stability limit toward instability, because otherwise the stability control can no longer be activated.

The limit value Mg is used for the preconditioning with respect to the range of the torque in the longitudinal direction, thus for the range restriction of the torque. As illustrated in FIG. 1, by use of the limit value Mg, for example, the torque maximally adjustable by the engine control and/or the brake control 3 is limited in the longitudinal direction (for example, in the acceleration direction or as an alternative in the braking direction) to the limit value Mg.

Figure 4:
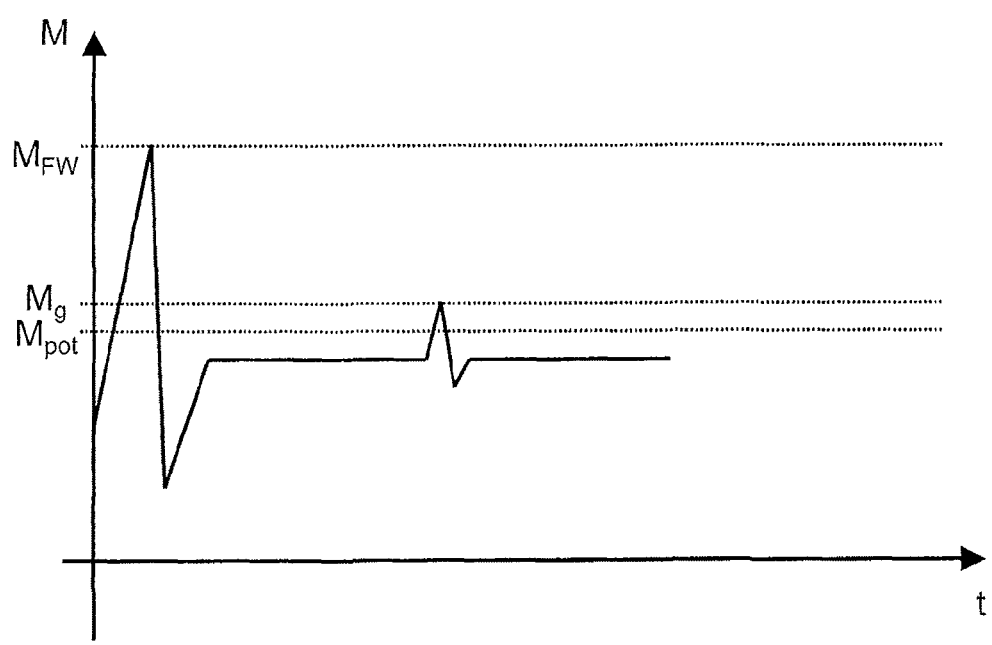
FIG. 4 is a graphical example of a course of a torque over time.

FIG. 4 illustrates graphically an example of the time behavior of a torque after an engine start with an initially still inactive (or hardly active) limitation and with an active limitation to the limit value Mg.

At the start of the system (start when the engine is started), it is very difficult to estimate the value of the coefficient of friction if there has not yet been a reaching of the stability limit after the start of the engine.

In a first embodiment, the system may be designed such that the limit value will not be activated before a reliable estimation for the coefficient of friction has been found for the first time (typically by reaching the stability limit). Only then will a corresponding limit value be used.

However, it may also be provided that, at the start of the system, a coefficient of friction and therefore also a limit value (or directly a limit value) are used as the starting value. The preset coefficient of friction and/or the preset limit value for initializing the system may be dependent on the temperature; in particular, they may increase as the temperature increases. In a second embodiment, the limit value can be set to a very high value at the start of the system; the effect will then be similar to that of the first embodiment. For this purpose, a very high value can then be assumed, for example, at the beginning, for the estimated coefficient of friction. As an alternative, in a third embodiment, the limit value can be preset to a low value at the start. For this purpose, a low value may be assumed at the beginning for the estimated coefficient of friction. During start of the drive, the coefficient of friction and thus also the limit value are "learned up". However, as a result, the driving dynamics will be limited during the initial start of the drive after the engine start.

As illustrated in FIG. 4, when the limitation has not yet been activated (first embodiment above) or a very high limit value is preset (second embodiment), it is first attempted to implement the torque MFW that is desired by the driver and that is clearly above the stability limit Mpot. The control loop is reacting very slowly; there is a large error amplitude. When the limitation is active, the torque stays limited to Mg as a result of the prelimitation (i.e., the set values for M do not become larger than Mg). The limit value Mg is slightly above the stability limit Mpot. The fault range is clearly smaller in comparison to previously.

A driving and/or braking power pilot control was described above, which determines a limit value for the driving or braking power and/or the driving or braking dynamics and which is disposed on the input side of the already existing control loop. In this case, the pilot control can limit the total power potential of the driving or braking system to a value appropriate for the driving situation. The control deviations will thereby be reduced.

The above-described invention makes it possible to improve the driving stability. The vehicle has a superior behavior in control situations. In addition, the loading of the participating components is reduced. Thus, the components, for example, hydraulic components or brake components, such as the brake lining, are subjected to less stress and have a longer service life. In addition, the invention makes it possible to reduce the number of control interventions in the ignition path. This results in better performance efficiency and an improved CO2 behavior. Furthermore, the behavior of the onboard wiring system can be improved with respect to the energy management (for example, avoidance of torque release of the intelligent generator control).

Further aspects of the invention already described in the above-mentioned earlier German Patent Application, File Number 10 2009 055 683.4, will be described in the following.

One aspect relates to an arrangement or a process for setting a driving and/or braking power for a vehicle based on the position of at least one control element, the stability of the vehicle being controllable by a control loop, and the control loop intervening in the driving behavior of the vehicle starting from a threshold position of the control element. In this case, the arrangement is provided for limiting the driving and/or braking power to a value that corresponds to a limit position of the control element between the threshold position and a selected position if the selected position is greater than the threshold position.

The threshold value may correspond to a value of the driving and/or braking power at which a static friction of the wheels of the vehicle changes to a sliding friction.

The control element can take up a position between a minimal and a maximal position, the distance between the minimal position and the limit position being 10% larger than the distance between the minimal position and the threshold position.

A computing unit may be provided for simulating the threshold value and/or the limit value based on a functional model of the vehicle.

The computing unit can be provided for computing a maximally conceivable lateral and longitudinal acceleration with respect to the vehicle based on the functional model of the vehicle and for deriving the threshold value and/or the limit value from the computed maximally conceivable lateral and longitudinal acceleration.

Furthermore, a storage element can be provided for storing the simulated threshold value and/or limit value.

According to a further aspect of the invention, it is suggested to draw conclusions on the situation-related laterally and longitudinally dynamic acceleration potential from an intelligent functional model formation based on existing sensor quantities or model-supported parameters.

On the basis of the present parameters, the maximally conceivable driving power limit and/or the maximally conceivable drive dynamics can be determined for the actual situation.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A process for limiting a torque of a control loop used for stabilizing a vehicle in an upward direction, wherein the control loop comprises a controller for stability control and wherein the process is carried out using a pilot control wherein, prior to stability control by the controller, a limit value is determined and the torque is limited in the upward direction such that, due to the pilot control, an intervention of the controller in the course of the stability control is reduced, the process comprising the acts of:
   detecting a coefficient of friction;
   determining the limit value for the torque as a function of the detected coefficient of friction, wherein the limit value is determined such that, despite limiting to the limit value, a stability limit can be passed through and the stability control performed by the controller can be activated; and
   limiting the torque of the control loop in the upward direction to the limit value.

2. The process according to claim 1, wherein the coefficient of friction is detected by estimating as a function of at least one vehicle-internal quantity.

3. The process according to claim 2, further comprising the acts of:
   storing the detected coefficient of friction;
   determining continuously a current coefficient of friction, wherein:
      an updated detected coefficient of friction corresponds to the current coefficient of friction when the stability limit is reached or control loop activity is detected, and otherwise corresponds to a maximum of the current coefficient of friction and the stored coefficient of friction.

4. The process according to claim 1, wherein:
   the coefficient of friction is detected when the stability limit is reached or control loop activity is detected.

5. The process according to claim 4, wherein upon reaching the stability limit or detecting control loop activity again, the process comprises the act of again detecting the coefficient of friction and determining the limit value as a function of the again detected coefficient of friction.

6. The process according to claim 5, wherein reaching of the stability limit or activity of the control loop is detected as a function of one of:
   a slip signal;
   a yaw rate signal; and
   a control signal indicating a control activity.

7. The process according to claim 4, wherein reaching of the stability limit or activity of the control loop is detected as a function of one of:
   a slip signal;
   a yaw rate signal; and
   a control signal indicating a control activity.

8. The process according to claim 1, further comprising the acts of:
   storing the detected coefficient of friction;
   determining continuously a current coefficient of friction, wherein:
      an updated detected coefficient of friction corresponds to the current coefficient of friction when the stability limit is reached or control loop activity is detected, and otherwise corresponds to a maximum of the current coefficient of friction and the stored coefficient of friction.

9. The process according to claim 1, wherein the coefficient of friction is determined as a function of the torque.

10. The process according to claim 1, wherein the act of determining the limit value further comprises the acts of:
    estimating a maximal torque as a function of the detected coefficient of friction; and
    determining the limit value as a function of the maximal torque, the limit value being greater than a maximal torque value.

11. The process according to claim 10, wherein the maximal torque corresponds to a maximal torque acting in a longitudinal direction and is estimated as a function of the detected coefficient of friction and as a function of a lateral acceleration.

12. The process according to claim 11, wherein the coefficient of friction is determined as a function of a longitudinal acceleration value and of a lateral acceleration value.

13. The process according to claim 1, wherein the coefficient of friction is determined as a function of a longitudinal acceleration value and of a lateral acceleration value.

14. The process according to claim 1, wherein the process limits the torque acting in a longitudinal direction of the vehicle.

15. The process according to claim 1, wherein the control loop is part of one of a wheel slip control system, an antilock system, a braking assistance system, a vehicle dynamics control system, and a drive drag torque control.

16. The process according to claim 1, further comprising the act of:
    limiting a temporal change of the torque as a function of the coefficient of friction.

17. An arrangement for determining a limit value for a torque of a control loop used for stabilizing the vehicle in an upward direction, wherein the control loop comprises a controller for stability control, the arrangement comprising:

a device configured to detect a coefficient of friction; and a device configured to determine the limit value for the torque as a function of an estimated coefficient of friction from the coefficient of friction detecting means, wherein the limit value is determined using a pilot control where, prior to stability control by the controller, the limit value is determined and the torque is limited in the upward direction such that, due to the pilot control, an intervention of the controller in the course of the stability control is reduced, and wherein further the limit value is determined such that, despite limiting to the limit value, a stability limit can be passed through and the stability control performed by the controller can be activated.

18. An automatic control system for stabilizing a vehicle in the upward direction, comprising:

an arrangement for determining a limit value for a torque of a control loop used for stabilizing the vehicle, wherein the control loop comprises a controller for stability control, the arrangement comprising:

a device configured to detect a coefficient of friction; and a device configured to determine the limit value for the torque as a function of an estimated coefficient of friction from the coefficient of friction detecting means, wherein the limit value is determined using a pilot control where, prior to stability control by the controller, the limit value is determined and the torque is limited in the upward direction such that, due to the pilot control, an intervention of the controller in the course of the stability control is reduced, and wherein further the limit value is determined such that, despite limiting to the limit value, a stability limit can be passed through and the stability control performed by the controller can be activated.

* * * * *